Sept. 10, 1940. T. H. KRUEGER Re. 21,558

INDEX TAB OR TITLE PROTECTOR

Original Filed Jan. 30, 1937

INVENTOR.
Theodore H. Krueger
BY Edward Thomas
his ATTORNEY.

Reissued Sept. 10, 1940

Re. 21,558

UNITED STATES PATENT OFFICE 21,558

INDEX TAB OR TITLE PROTECTOR

Theodore H. Krueger, Shelton, Conn.

Original No. 2,164,928, dated July 4, 1939, Serial No. 123,130, January 30, 1937. Application for reissue June 18, 1940, Serial No. 341,160

9 Claims. (Cl. 129—16.8)

This invention relates to index tab or title protectors and is herein illustrated in some detail as embodied in cards and folders as used in files.

In the past makers of filing equipment have found it possible to manufacture and place on the market folders and cards carrying a variety of protected standardized indexings or titles, such as letters of the alphabet, days of the month, and days of the week, by printing the indexing letters or digits and then covering the printing with transparent sheets adapted to resist wear and soiling.

Such covering ordinarily had to be done at the manufacturing plant where the printing was done, and, where identical titles or index headings were turned out by the thousand, relatively easy and cheap methods would be used to cover the printed words and digits with Cellophane and Celluloid.

A different problem was presented when individual and specialized titles were written in private offices and typists attempted to cover the titles with Cellophane or other protective transparent covers. It was found almost impossible for an average person to satisfactorily paste a piece of Cellophane, for example, over an index tab, or over a title, on a card, because the Cellophane wrinkled up, excess paste oozed out around the edge soiling the tab, or else too little paste was used. Moreover, the water, or other liquid solvent, was less convenient, damaged the writing by blurring the ink, and usually warped the card in drying so that it did not lie flat. The operation, in addition, was slow and messy and usually soiled the operator's fingers.

Since it is so impractical for the average user to apply transparent sheets as a protection to index tabs, the industry has found it necessary to resort to numerous very expensive substitutes, most of which consist of a metal or Celluloid frame or title holder, into which a separate loose strip of paper or cardboard can be inserted after the title has been written on this loose separate sheet. Such metal or Celluloid frames often double the cost of the whole index card. In fact, those which are made of sheet metal and riveted to the indexing cards often cost several times as much as the whole card costs. Nevertheless, the customer's need for writing his own title rather than buying a standard printing title is so great that many customers have paid this exorbitant price to achieve this end.

When so-called Scotch tape was used, in an endeavor to avoid some of the foregoing difficulties, it was found difficult to avoid wrinkles in applying the permanently sticky and tacky tape and, moreover, Scotch tape failed to give a reliably permanent and tight seal. Scotch tape was, therefore, useful only in highly skilled hands.

According to the present invention the foregoing and other difficulties are overcome, and a protective coating is disclosed which is simple to apply, cannot soil the card or file to which it is applied, does not make a mess, either on a card or on the fingers, and, in one preferred form is readily removable to make corrections or alterations, if desired.

In the form of the invention described in some detail, the paper card or folder to receive the title is provided with a strip of transparent covering material, such as cellulose acetate, adhering to the card or folder adjacent the space where the title is to be written, but leaving that space uncovered. After the title has been written in, a folded-back extension or flap of the strip is folded down over the writing and caused to adhere to the face of the card or folder.

The device of the invention is well adapted to be manufactured on a large scale so that the cards or files may be shipped out with the flaps attached, but, preferably, bent back so that the uncoated face of the free end lies against the face of the card or file, leaving open the tab or other area upon which it will be desired to write.

The user then writes upon the tab or other area which the flap is designed to cover, and finally folds down and seals the flap over the writing.

The folded down flap completely protects the writing. It has been found possible to coat the folded down face of the flap with a normally non-sticky, non-adherent coating, which, upon the application of moderate heat and pressure readily adheres to the card or folder and is easily smoothed down. The kind of adherent coating described in some detail below is found to adhere better to the cellulose acetate film, than any other known adhesive, is almost transparent, colorless and practically invisible in the coatings of the present invention, and has a life of years, thus providing means for attaching an extremely thin almost invisible cellulose acetate strip to the card or folder.

The thinness of cellulose acetate and its great transparency, and its toughness, when thus applied enable records to be kept at a minimum of bulk, very easy to read, highly resistant to wear, and yielding to ordinary bending, thus avoiding the objections to Celluloid and other heavier coverings which add to bulk, often crack or become bent, and sometimes fall off.

Other features and advantages will hereinafter appear.

Figure 1:
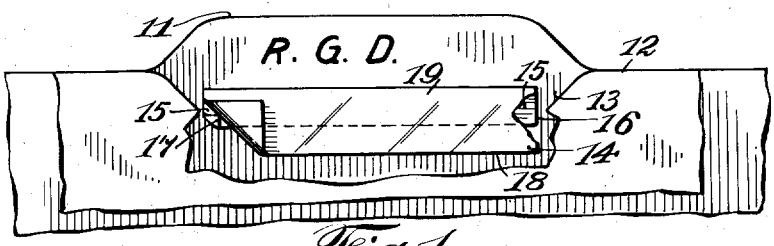
Figure 1 shows one form of folder ready to have written thereon a title which is to be protected.

In the form of the invention shown in Figure 1, an ordinary type of two-sided container or folder 10 is provided with the usual tab 11 which is to receive some index marking of title written across the tab, usually above the line of the upper edge 12 of the body of the folder.

In the form shown, the folder, just below the tab, carries on the inside face 13, a folded flexible strip of cellulose acetate film, so that an extension or part 15 of one face 16 of the film lies against the face 13 of the folder and adheres thereto. To cause the part 15 to thus adhere, it carries an adhesive coating 17 which adheres to the face 13 of the folder 10.

The other part 18 of the face 16 of the film carries an adhesive, preferably a transparent heat-softened, normally non-sticky adhesive coating 19, which may be the same as the adhesive coating 17, and may be an ester, or other synthetic gum, of low melting point, but preferably is the adhesive described below. In any event, the adhesive softens and adheres to the paper, at a temperature below the temperature at which the paper scorches in applying it.

To make the preferred adhesive, paraffine wax having a melting point of 130 to 132° F. was melted and 6% to 30% of thin pale crepe rubber R. C. M. A. not more than 0.04 inch thick was quickly immersed in individual sheets at 200° F. soaked for fifteen minutes and the mixture agitated for two hours in a Warner-Pfleiderer class III type BB mixer. An age resistant such as ½% of hydroquinone could be added.

The film tape was coated by passing over a steam heated roll on the surface of which rode a doctor with a rounded edge. Properly adjusted, the doctor put on the film a transparent, almost imperceptible coating which hardened at once in the air and the film was rolled up.

The ingredients (other wax was usable) were preferably so adjusted that the film became adhesive between 150° and 200° F.

It was found possible to substitute gutta percha for the rubber.

Figure 2:
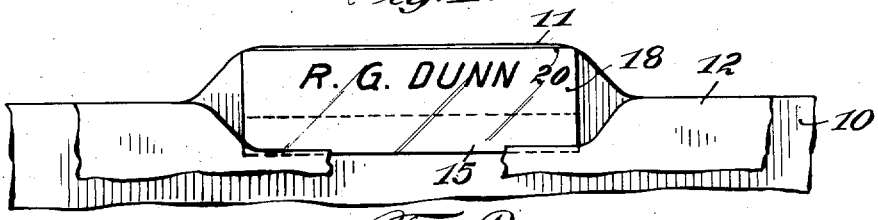
Figure 2 shows the title with an overlying protective transparent film on the folder.

In the form shown the folder 10 carrying the folded-over strip 14 is well adapted to be inserted in a typewriting machine and have written upon it the title shown in Figure 2.

When that or other title has been written, the part 18 may be turned on the fold and laid against the face 13 and smoothed down by a suitable hot tool. In default of a special tool it is even possible to smooth down and heat the part 18 by some lighted ordinary electric incandescent lamp bulbs, and obtain a satisfactory adhesion.

It will be noted that the part 18 is shown in Figure 2 with its upper edge 20, terminating just short of the upper edge 11, below the point where the fingers of a person looking through the file can catch the edge 11.

Thus the title under the strip 14 is fully protected and is clearly readable as appears in Figure 2.

Figure 3:
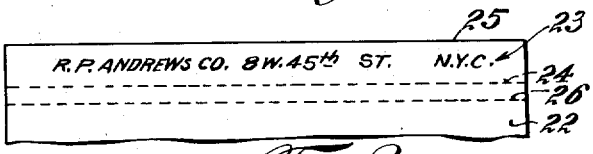
Figure 3 shows a modified form of protection as supplied on a card.
Figure 4:
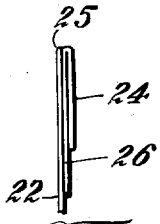
Figure 4 is an end view of the card of Figure 3 with the flap folded down.
Figure 5:
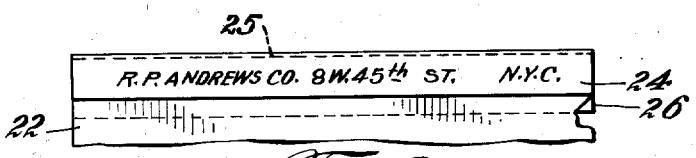
Figure 5 shows the title of Fig. 3 with the overlying protective transparent film, adhering to the card.

The "card-catalog" card 22 shown in Figure 3 may have a title typed or written upon its upper line 23, and then the flap 24 of transparent cellulose acetate, or other film, bent over the upper edge 25 of the card and smoothed down, as with a hot iron, over the upper line 23 so as to firmly adhere to the face of the card 22 as seen in Figure 5.

To attain these ends, the flap 24 is shown as coated with one of the heat-softened adhesives referred to above so that the adhesive will hold it to the face of the card. The flap 24 is shown as an extension of a sheet 26 or film held to the back of the card along its upper edge. The sheet 26 may be held to the back of the card by the same kind of adhesive as that carried by the flap 24.

The card 22, with its flap 24 bent back to lie against the back of the card is well adapted to be written upon in a standard typewriting machine without injury to the flap or machine, and then have its flap 24 sealed down to cover the writing. Often, such a card is partly cut away to leave the writing on a projecting tab like the tab 11.

Figure 6:
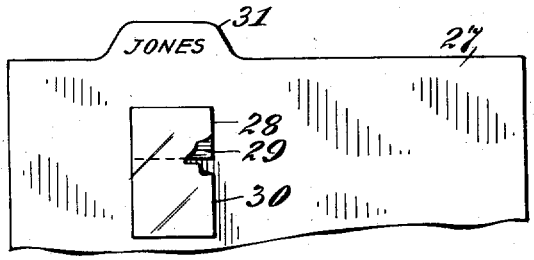
Figure 6 shows a modified form of protection as supplied on the card.
Figure 7:
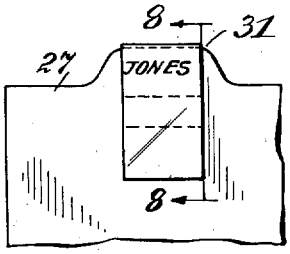
Figure 7 shows the title of Fig. 6 with the overlying protective transparent film adhering to the card.
Figure 8:
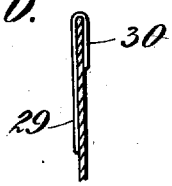
Figure 8 is a sectional view of the card along the line 8—8 of Figure 7.

The guide card 27, is shown in Figure 6 with a flap 28, of which a part 29 adheres to the card 27, while the free length 30 is long enough to extend from the part 29 over the top of the tab 31, and, if desired, down the opposite face of the tab. Thus a catch heading or catch letter may be written on the tab 31 and the film length 30 fastened down over it. If desired the catch heading may be written or typed on the side of the tab opposite the side of the card to which the flap adheres so that it is covered by the free end of the flap coming down over the end of the tab.

The heat sealed adhesive described above has many advantages for most purposes, though it often is possible to use many other commercial adhesives which may be water-softened, or softened with some other solvent.

It is possible to substitute other films especially cellulose derivative films, such as viscose films, or films with a viscose base, or pyroxylin films, for the cellulose acetate films. Some films may need a plasticizer, but all those named adhere well to the heat-softened paraffine-wax-rubber adhesive named above.

The heat-softened paraffine-wax-rubber adhesive has the further advantage that a strip or cover held down by it may be released by applying the same heat used in sealing it down. When released, it may be lifted and any desired change made in the underlying notations or writing.

Having thus described certain embodiments of the invention, what is claimed is:

1. A sheet adapted to receive a title, a strip of non-adhering but transparent flexible material lying near the location where the title will come, an extension of the strip adhering to the sheet, and a normally non-sticky water-insoluble transparent coating on the non-adhering strip adapted to seal the strip to the sheet under heat and pressure to cover the title and dependent upon the presence of paraffine for low melting and dependent upon the presence of rubber for adhesion.

2. A sheet adapted to receive a title near an edge, a strip of transparent flexible material attached near said edge and having an extension adapted to overlie the title but not adhering to it, and a normally non-sticky water-insoluble transparent adhesive on the extension adapted to seal the extension down over the title when hot pressed against the sheet at the title and dependent upon the presence of paraffine for low melting and dependent upon the presence of rubber for adhesion.

3. A sheet adapted to receive a title near an edge, a strip of transparent flexible material attached near the edge, a free extension of the strip adapted to overlie the edge and cover the title, and a normally non-sticky water-insoluble transparent adhesive on the extension adapted to seal the extension down over the title and around the edge when hot pressed against the sheet at the title and dependent upon the presence of paraffine for low melting and dependent upon the presence of rubber for adhesion.

4. A sheet adapted to receive a title, a strip of transparent flexible cellulose acetate base film adhering to the sheet and having a non-adhering extension adapted to overlie the title, and a normally non-sticky water-insoluble transparent coating on the non-adhering extension adapted to seal the extension to the sheet under heat and pressure to cover the title and dependent upon the presence of paraffine for low melting and dependent upon the presence of rubber for adhesion.

5. A sheet adapted to receive a title near an edge, a strip of transparent flexible cellulose acetate base film adhering to the sheet and having a non-adhering extension adapted to overlie the title but to end clear of the edge, and a normally non-sticky water-insoluble transparent coating on the non-adhering extension adapted to seal the extension to the sheet under heat and pressure and dependent upon the presence of paraffine for low melting and dependent upon the presence of rubber for adhesion.

6. A sheet adapted to receive a title near an edge on the face, a strip of flexible transparent cellulose acetate base film adhering to the back of the sheet and having an extension adapted to bend over the edge and cover the title, and a normally non-sticky water-insoluble transparent coating on the extension adapted to seal the extension to the sheet on the title under heat and pressure and dependent upon the presence of paraffine for low melting and dependent upon the presence of rubber for adhesion.

7. A paper sheet adapted to receive a title near an edge on the face, a strip of flexible transparent cellulose acetate attached to the sheet below the space for the title and having an extension reaching across the title and beyond so that its end will bend over and lie behind the sheet, and a normally non-sticky transparent coating adapted to seal the extension to the sheet on the title under heat and pressure.

8. A relatively stiff paper sheet adapted to receive a title near an edge on one face, a relatively flexible transparent cover film attached to the sheet near the space for the title and having a free extension adapted to be bent to cover or uncover the title which may be written in said space, and a normally non-sticky transparent coating adapted to seal the extension to the sheet under heat and pressure so as to overlie the title.

9. A relatively stiff paper sheet adapted to receive a title near an edge on one face, a relatively flexible transparent cover film of cellulose acetate attached to the sheet below the space for the title and having a free extension adapted to be bent to cover or uncover the title which may be written in said space, and a normally non-sticky transparent coating adapted to seal the extension to the sheet under heat and pressure so as to overlie the title.

THEODORE H. KRUEGER.